H. E. BASS 3,100,499

VALVE

Filed July 21, 1961

H. E. BASS 3,100,499

VALVE

Filed July 21, 1961

United States Patent Office 3,100,499
Patented Aug. 13, 1963

3,100,499
VALVE
Harold E. Bass, Gales Ferry, Ledyard, Conn., assignor to General Dynamics Corporation, New York, N.Y., a corporation of Delaware
Filed July 21, 1961, Ser. No. 125,833
9 Claims. (Cl. 137—246.22)

The present invention relates to valves, and more particularly to ball valves of the type intended to control the flow of liquids under substantial pressure. For example, valves of the type shown in Bass and White United States Patent No. 2,989,990, issued June 27, 1961, and valves of the type shown in copending Bass and White United States patent application Serial No. 56,292, now Patent No. 3,050,082, filed September 15, 1960.

The invention is applicable primarily to so-called three-way ball valves in which appropriate rotation of the ball will seal off a common port or will connect the common port to either of two end ports. Hence, the invention will be described primarily in connection with three-way ball valves, although it should be understood that certain principles of the invention are applicable to straight through two-way ball valves and to angled two-way ball valves.

In ball valves of the general type described in the aforementioned Bass and White patent and application, and particularly in three-way ball valves, a problem of uneven seat seal wear has been encountered which has undesirably limited the number of cycles of leak-free valve operation in certain types of service. A principal object of the invention has been the provision of a novel and improved valve construction which greatly extends the number of cycles of valve operation which may take place under such conditions.

Another object of the invention has been the provision of a novel and improved seat seal for use in ball valves.

A further object of the invention has been the provision of a novel and improved ball valve construction in which operating torque requirements are substantially reduced as compared to similar valves of earlier constructions.

Still another object of the invention has been the provision of a novel and improved lubricated valve construction.

Other and further objects, features and advantages of the invention will appear more fully from the following description of illustrative embodiments of the invention taken in connection with the appended drawings, in which.

Figure 1:
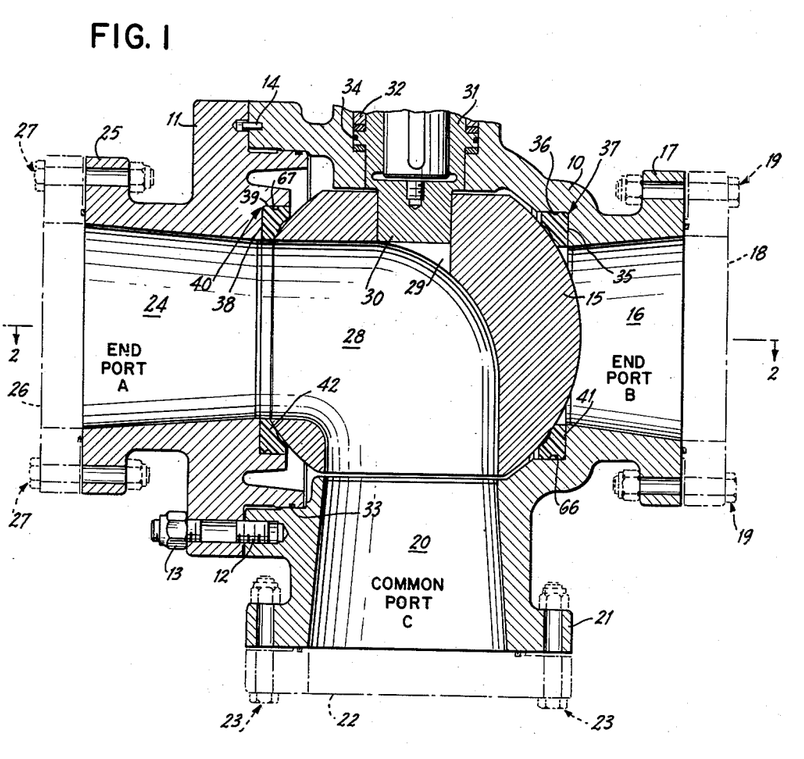
FIG. 1 is a longitudinal sectional view illustrating a three-way valve constructed in accordance with the invention.

Referring now to the drawings and more particularly to FIG. 1, there is shown a generally cylindrical valve body or housing 10 and a generally cylindrical valve bonnet 11 connected to the valve body by means of peripherally spaced studs 12 and cooperating nuts 13. A locating pin 14 acting in aligned apertures in mating radial surfaces of the valve body and valve bonnet is provided to assure proper alignment of the valve body and valve bonnet. A self-centering or floating ball 15 is located in and substantially fills the cavity afforded within the valve body and valve bonnet.

The valve body 10 is provided at one side thereof with an axially extending opening 16 which may be cylindrical or may be tapered slightly, as shown. The opening 16 forms an end port, here designated end port B, which affords communication between the exterior and interior of the valve. A flange 17 at the end of the valve housing adjacent the outer end of end port B is provided for attachment to a suitable pipe fitting or other liquid carrying element, indicated diagrammatically at 18, by peripherally spaced bolts and nuts 19.

A similar opening 20 at the bottom of valve body 10 forms common port C. Adjacent the outer end of common port C a flange 21 is provided for attachment to a suitable pipe fitting or other liquid carrying element, indicated diagrammatically at 22, by peripherally spaced bolts and nuts 23.

Valve bonnet 11 is provided with a similar opening 24 forming end port A. Adjacent the outer end of end port A a flange 25 is provided for attachment to a suitable pipe fitting or other liquid carrying element, indicated diagrammatically at 26, by peripherally spaced bolts and nuts 27.

End ports A and B are axially aligned and are each disposed at right angles with respect to the axis of common port C. The ball 15 is provided with a curved generally cylindrical passage 28 the ends of which are disposed at 90° with respect to each other. The passage 28 is arranged to provide communication between common port C and end port A, between common port C and end port B, or to seal off the end ports and the common port so that there is no communication between the ports, all by rotation of ball 15 about the axis of common port C so as to provide the desired alignment or lack of alignment of the passage 28 and the respective ports. The ends of the passage 28, which may be termed the ball noses or edges, are preferably rounded, as shown.

The ball 15 is provided with a square-sided opening 29 adapted to accommodate a similarly shaped end 30 of a valve operating stem 31 acting in a bushing 32 provided in an aperture in the upper end of valve body 10. The stem 31 may be power operated or manually operated, as desired, and rotation thereof produces a corresponding rotation of ball 15.

Suitable fluid pressure-tight seals such as O rings are provided between mating surfaces of the valve body and bonnet and between the valve body and valve stem, as shown at 33 and 34, respectively.

Valve body 10 is provided with a radially extending annular shoulder 35 and an axially extending annular shoulder 36 forming an annular valve seat 37. Valve bonnet 11 is provided with a radially extending annular shoulder 38 and an axially extending annular shoulder 39 forming an annular valve seat 40. The valve seats 37 and 40, which are axially aligned with each other and with the end ports, accommodate annular seat seals 41 and 42, respectively. The seat seals may be identical in construction or they may differ in certain respects as will be described hereinafter. However, in general configuration, the seat seals will be identical, and they will be disposed oppositely so that each presents a corresponding face to the ball 15.

Figure 5:
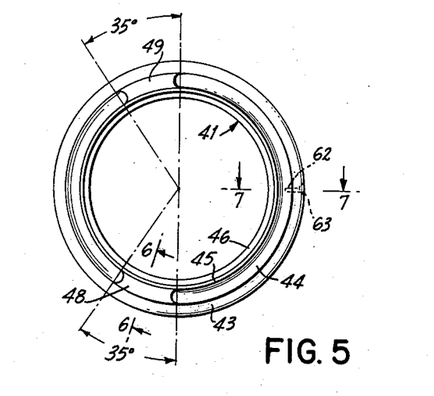
FIG. 5 is a front elevational view of a seat seal constructed in accordance with the invention and adapted for use in the valve of FIG. 1.
Figure 6:
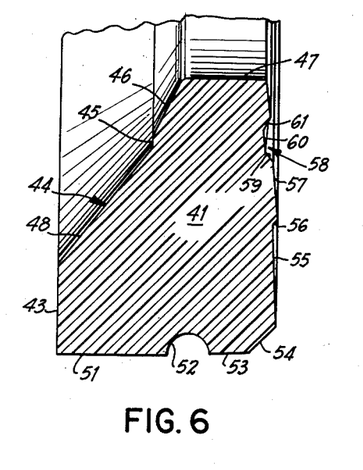
FIG. 6 is a cross-sectional view taken along the line 6—6 of FIG. 5.
Figure 7:
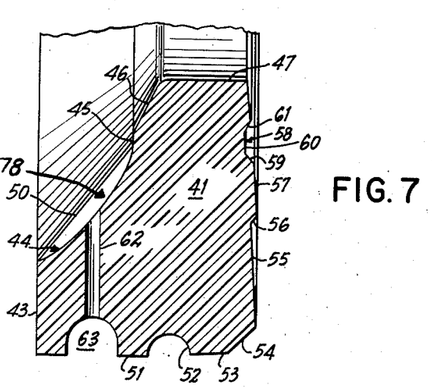
FIG. 7 is a cross-sectional view taken along the line 7—7 of FIG. 5.

The seat seal 41 is shown in detail in FIGS. 5, 6 and 7. As shown in these figures, the front side of the seal (the side facing the ball) is formed by a vertical surface 43, an inclined surface 44, a short vertical surface 45, and an inclined surface 46. The inclined surface 46 merges on a short radius curve with seat seal axially extending inner diameter surface 47. As shown in FIG. 1, the seat seal inner diameter is the same as the adjacent diameter of the end port.

Over a region 48 and a region 49 (FIG. 5) the inclined surface 44 is generally straight and is built up above the level of the remaining portions of the surface 44. As a practical matter, the surface 44 may be formed initially throughout as in the regions 48 and 49, and may then be relief cut, as by a spherical radius end mill, to give a concave relieved shape to the remaining portions of the surface 44. A comparison between the surface 44 in the regions 48 and 49 and the remaining areas of this surface is afforded by the line 50 in FIG. 7, which corresponds to the line 48 in FIG. 6. In effect, the regions 48 and 49 form pads which stand out from the remainder of the surface 44. The reasons for providing the pads 48 and 49 will be explained hereinafter. The pads 48 and 49 might each extend over a circumferential arc of 35°, as shown in FIG. 5, measured from the left of the vertical center line in FIG. 5.

The outer diameter of the seat seal is formed by an axially extending surface 51 which is provided with a semicircular slot 52 extending over the entire periphery of the outer diameter and forming an annular O ring receiving groove. That portion of the surface 51 extending rearwardly of the forward edge of the slot 52 may be inclined slightly away from the horizontal, e.g., about 3°. This inclined portion is designated 53. The rear edge of the surface 51 is chamfered, as shown at 54.

The rear face of the seat seal is formed by a series of generally vertically extending surfaces. The first surface is designated 55 and may be inclined forwardly, e.g., 2½°. The surface 55 meets a rearwardly inclined shoulder 56, which in turn meets a forwardly inclined surface 57, which might be inclined, for example, at 5° from the vertical. The surface 57 is provided with a relief chamber 58 formed by shoulders 59, 60 and 61. At its inner end surface 57 meets inner diameter surface 47.

The seat seal 41 is provided with a narrow radial bore 62 having an enlarged semispherical base 63 adapted to receive a grease fitting assembly, as will be described hereinafter. The bore 62 terminates at an intermediate point on the concave relief cut in surface 44, preferably at about the radial center of surface 44.

Figure 2:
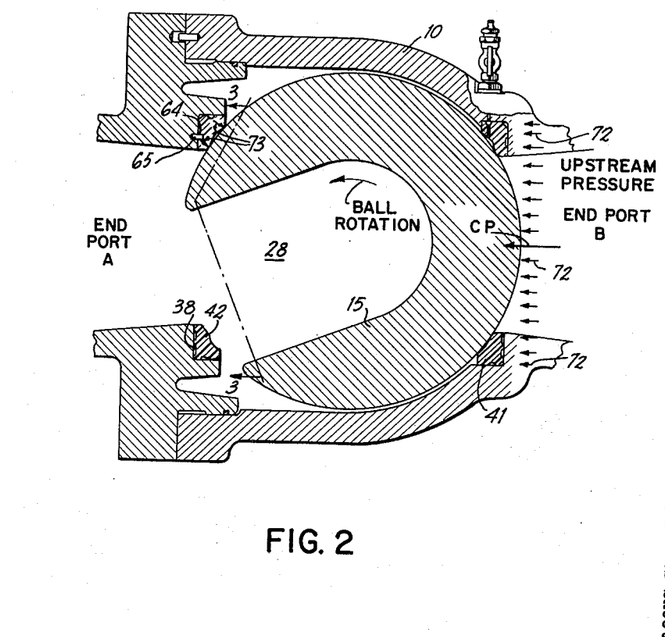
FIG. 2 is a partly diagrammatic horizontal sectional view taken along the line 2—2 of FIG. 1.

The seat seal 42 is preferably identical to the seat seal 41 except that the radial bore 62 and base 63 are omitted and a narrow axially extending round slot 64 is provided to receive a locating pin 65 which extends axially from a corresponding slot in seat surface 38, all as shown in FIG. 2.

As shown in FIG. 1, the slot 52 in each of the seat seals carries an O ring seal, the O ring for seat seal 41 being designated 66 and the O ring for seat seal 42 being designated 67. The purpose of the O ring seals 66 and 67 will be described hereinafter.

The valve parts, other than the seat seals 41 and 42, may be made of any convenient materials. For example, for submarine sea valve service the ball, valve body and valve bonnet might be made from a nickel-copper alloy.

But the material from which the seat seals 41 and 42 are made should be chosen with particular care. Thus this material should have substantial tensile strength, substantial flexural stiffness and hardness and an ability to resist cold forming while nevertheless affording a good seal. The modulus of elasticity is preferably at least $0.2 \times 10^6$ pounds per square inch, and it is desirable that it be higher. A lower modulus of elasticity may be used for lower pressures. At the present time the best known material is nylon impregnated with molybdenum disulfide, sold under the designation "Nylatron GS" by Polymer Corporation of Pennsylvania, of Reading, Pennsylvania. Another example of a suitable material for the seat seals is a glass filled nylon with or without molybdenum disulfide impregnation, for example, the products sold by Fiberfill Corporation of Warsaw, Indiana, under the designation "Nylatron-G" and "Nylatron-G-MS," respectively. Still another example of a satisfactory material is a glass-reinforced nylon molding compound sold by Balding Corticelli Industries under the designation "BC I Nylon Resin LX-1115 F." This product exhibits a modulus of elasticity of about $1.13 \times 10^6$ p.s.i. and a tensile strength of 14,000 p.s.i. Another example of a material which can be used, although not considered to be as satisfactory as "Nylatron GS" is "Kel-F," which is a polymer of trifluorochloroethylene sold by M. W. Kellogg Co.

Where the seat seal material is hygroscopic, it should be moisture conditioned to a substantial moisture equilibrium so that it will not swell appreciably or decrease in strength appreciably under operating conditions.

The basic operation of the seat seal will be described in connection with FIG. 10. For simplicity, this basic description will be similar to that described for a two-way valve in the aforementioned Bass and White patent and will ignore the complexities introduced by the presence of three ports. A complete description of the valve operation will be set forth hereinafter, but for the present the end port A may be considered a downstream port toward which the ball 15 is urged in an axial direction by fluid in the line. The seal 68 of FIG. 10 corresponds to seat seal 42 and is similar in construtcion to the seals 41 and 42.

Figures 9, 10:
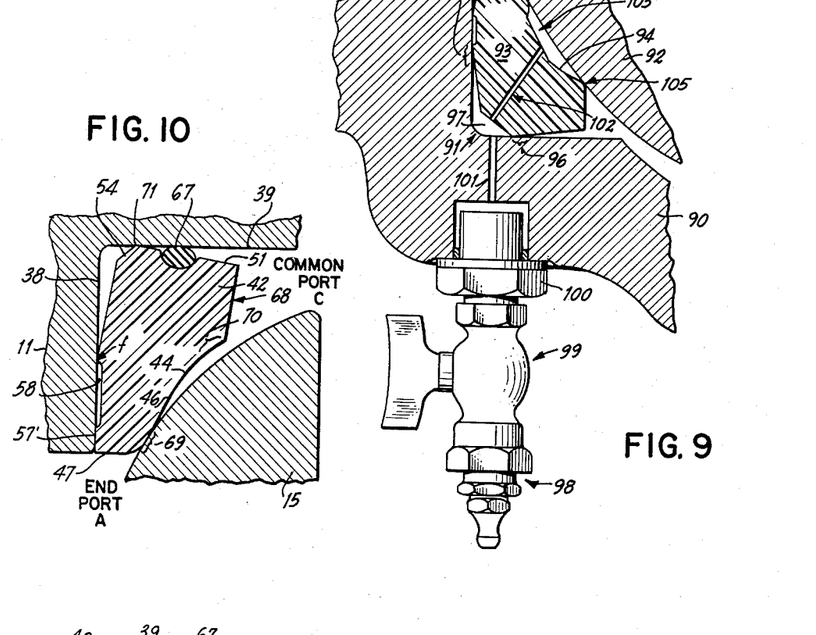
FIG. 9 is an enlarged partial sectional view of a two-way straight through ball valve illustrating application in accordance with the invention of lubricating means to such a valve.
FIG. 10 is an enlarged partial sectional view of a seat and seat seal, and is intended for explaining the basic valve sealing operation.

FIG. 10 shows the ball 15 in position to close off end port A and bearing under load against seat seal 68. The valve is initially subjected to a suitable preload, as by tightening the nuts 13 on studs 12. The amount of tightening required to achieve a desired preload is not critical because the flexibility of the seat seals will accommodate considerable variation while maintaining a relatively constant preload. In the preload condition (but with the valve closed), the ball 15 contacts front side bearing area 69 of surface 46, but does not contact the remaining area of surface 46 or surface 44. The bearing area 69, which may be termed the "main" front side bearing area, is preferably relatively small, but will be greater for higher values of preload. The amount of preload placed upon the seals is dependent upon the amount of wear and creep which the seals will undergo during their lives. Although the wearing rate tends to be more or less constant, the creep rate is greatest during the early life of the seals until the seal material becomes strain or work hardened.

The rear or back side bearing area 57' of the seat seal would, under preload conditions, be spaced from the seat surface 38. This spacing (prior to preloading) is preferably equal to the sum of the manufacturing tolerances (maximum) of the corresponding portions of the valve seat, seat seal and ball multiplied by a factor up to about 3 to 4. The spacing decreases after preloading and may even substantially disappear with an appropriate accumulation of manufacturing tolerances. However, even if this dimension decreases substantially to zero under preload, from a sealing standpoint spacing still exists since fluid can easily pass by the bearing surface until a substantial load is applied.

By using shims (not shown) between the bonnet 11 and the valve body 10, manufacturing tolerances can be relaxed.

As the valve is closed through rotation of the ball 15, the seat seal 68 is subjected to a torsional twisting force transmitted thereto from the ball. This torsional twisting force may conveniently be considered as acting about a point $f$ as a fulcrum, although, strictly speaking, it would be more accurate to refer to twisting about the centroid or center of twist. Actually, the fulcrum is a circular line representing the locus of the various points $f$ about the back side of the seat seal, but it is convenient to consider the seal operation from the point of view of a single cross section. The seal operation is a summation of the operations of all of the cross sections.

The torsional twisting of the seat seal continues until the back side bearing area 57' makes a seating contact with the seat surface 38. This seating contact can occur at any desired proportion of full load pressure on the ball, but preferably the contact will occur when the fluid pressure is about 1/10–1/2 of its rated full load value. The seat seal is, of course, subjected to a bending stress during the torsional pivoting, but this stress is relatively small because it does not increase with increasing load after the back side bearing area 57' makes seating contact with the seat surface 38. Hence the elastic limit of the seal material is not exceeded and there is no permanent deformation of the seal. Thus the valve may be caused to experience repeated cycles of operation and still maintain a good sealing action at low pressures as well as at high pressures. Excessive bending of the seat seal would tend to result in permanent deformation and hence in leakage at low pressures. At low pressures, sealing is afforded by contact between the ball and the seal in the area 69 and between the O ring 67 and the surface 39.

In the valve open position, no contacts is afforded between the ball 15 and the seat seal surface 44. But, as the valve is moved toward closed position (or toward open position), motion of the ball 15 under the fluid pressure and torsional twisting of the seat seal cause contact to occur within the area 70. The radial length of the contact area 70 will be limited to a short length adjacent the outer diameter of surface 44 except in the regions occupied by pads 48 and 49. Thus, the pads 48 and 49 will provide a radial length of contact area approximately one-third the radial length of the surface 44. The contact area 70, which may be termed the "auxiliary" front side bearing area, increases in radial length with an increase in the load, the greatest amount of contact area occurring when the ball is at full load. Preferably, contact between the ball 15 and the surface 44 occurs at substantially the same load as contact between the rear side bearing area 57' and the surface 38.

Because of the constraint afforded by the seat walls, the fulcrum point $f$ can move only in a vertical direction, and it moves a small distance radially toward the seat surface 39 along the wall 38 as load is placed on the seat by fluid pressure acting on the ball 15. During the twisting action the centroid or center of twist of the seat seal moves in a horizontal direction (toward the back side with increasing load) because of the vertical spacing between the centroid and the fulcrum point. If hoop stretching occurs, the centroid moves vertically toward the seat surface 39. Hoop stretching increases the elasticity of the seat seal, providing better sealing action between the ball and the seal, especially in high pressure valves.

The seat seal cross-sectional area should be sufficient to withstand the flexural stress resulting from torsional twisting of the seal, the compressive stress resulting from thrust of the ball upon the seal and the tensile stress resulting from hoop stretching of the seal, i.e., stretching in a radial direction. To prevent the hoop stresses within the seal from exceeding the elastic limit of the seal material, a portion of the outer periphery of the seal may be arranged to come into restraining or confining contact with the seat before the elastic limit of the seal is reached. Such restraining contact is afforded by the point 71. The point 71 contacts the surface 39 because of hoop stretching and effectively limits radial expansion of the seat seal before the elastic limit of the seat seal material is exceeded. "Elastic limit," as used herein, should be considered as referring to a practical working stress which will afford a reasonable valve life.

In the three-way valve of the invention the fulcrum point $f$ should be located radially inwardly of the centroid and preferably radially inwardly of the radial midpoint of the seal. By radial midpoint of the seal is meant a circle having a radius equal to:

$$\frac{I.D.}{2} + \frac{(O.D. - I.D.)}{4}$$

where "I.D." is the seal internal diameter and "O.D." is the seal outside diameter, including the O ring.

The sealing action in the three-way ball valve of the invention will now be described in detail in connection with the schematic force diagrams of FIGS. 11A and 11B, which illustrate operation of the seal 42, valve seat 40, and ball 15 of FIG. 1 under different pressure conditions. In these figures, the vector P equals the axial resultant pressure thrust caused by the differential valve pressure acting on the valve seat. The vector P' is equal to but opposite in direction to the vector P. The vector R equals the reaction of the P force on the valve body. The vectors F and F' are the reaction forces of the seal against the ball, causing sealing. The various vectors could be expressed numerically in pounds per circumferential inch.

The three-way ball valve seat seal must seal against pressure from both directions, i.e., with any combination of differential pressures across the three-valve ports, pressure must not leak past either of the two-valve seat seals while the valve is in the closed position or leak from C to A when the ball is open to B and vice versa. The seat seals of the three-way valve afford tighter seals with increasing differential pressures.

Figure 11A:
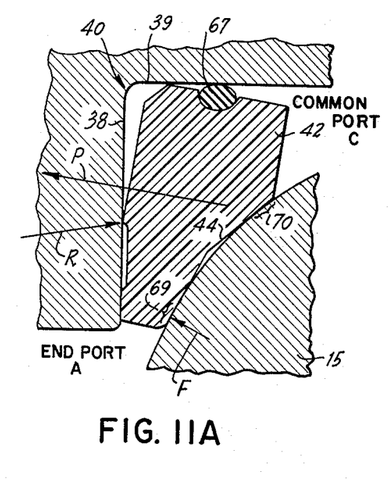
FIGS. 11A and 11B are schematic force diagrams for use in explanation of the three-way valve sealing operation.

Considering first the situation in which the end ports have equal low pressures with a high pressure in the common port, the valve sealing operation is illustrated in FIG. 11A. The high pressure in the common port seeks to leak out past the bearing area 69 or the O ring 67. Initially, the seat seals have been preloaded between the valve body and the ball, causing the seat seals to rotate and pivot about their fulcrum points. This action causes the seals to be "wound up" torsionally and results in a positive seal-ball bearing pressure.

When the differential pressure acts on the seal, the preload bearing pressure stops any low or initial pressure from leaking past the seal bearing area 69. The O ring 67 also stops pressure leakage. The differential pressure acting on the seal tends to force the main body of the seal longitudinally outward (vector P). However, since the fulcrum point in contact with the valve seat is located radially inward of the radial midpoint of the seal, the reaction force (vector R) causes the seal to pivot about the fulcrum point in a counterclockwise direction (FIG. 11B). This causes the seal area 69 to try to advance further into the ball, increasing the seal-ball bearing pressure (vector F). The greater the pressure differential the greater will be the seal-ball bearing pressure. In other words, the higher the differential pressure the tighter will be the seal.

By moving the radial location of the fulcrum point, the seal-ball bearing pressure may be changed for a given pressure differential on the valve.

With both end ports at equal low pressure, the ball does not move but the seat seal surface just bears tighter and tighter as the pressure increases.

Figure 11B:
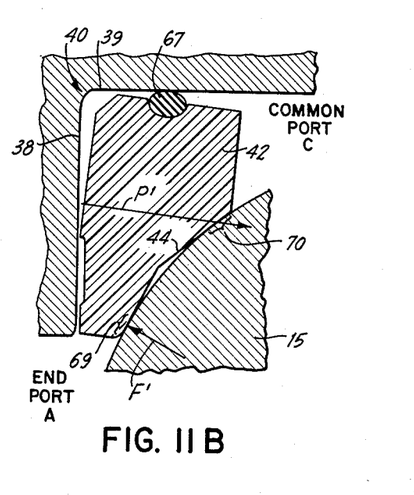

When the common port pressure is less than the end port pressures, but with the end port pressures equal, the situation illustrated in FIG. 11B prevails. Because of the initial torsional preload, any initial pressure trying to get past the seal toward the common port is stopped by the preload seat seal-ball bearing pressure. The O ring also seals against leakage. As the differential pressure increases, the seat seal tends to move longitudinally toward the ball (vector P'), increasing the sealing pressure on the ball. Due to the wedging action of the seat seal against the ball, large differential pressures cause the seat seal to hoop stretch radially outward, keeping the O ring from blowing out as the seat seal rotates, which rotation will continue with increasing differential pressures until the second contact area of the front face of the seal (auxiliary front side bearing area 70) contacts the ball. Thereafter, seat seal deformation is mostly hoop stretching, holding the O ring more tightly.

In this case the seat seal effectively moves toward the ball after the seal preload has been exceeded by differential pressure. The fulcrum point $f$ loses contact with the valve body. When the differential pressure is equalized (by opening the valve from one port and then to the other port), the seat seal returns to its original preload condition.

When the end ports A and B differ in pressure from each other and from the common port, the ball will move horizontally. If the pressure in end port A is greater than in the common port, which pressure in turn is greater than in end port B, then the seat seal next to port A will advance toward the ball (as in FIG. 11B) and cause positive sealing. The seat seal next to end port B, however, will act as described in connection with FIG. 11A and, in addition, the ball will transmit a torsional twisting force to this seal similar to that previously described on the assumption of a straight through valve, further increasing the sealing action of this seal. In this connection, the pressure differential across a straight through valve causes positive sealing on the downstream seat seal.

Referring now particularly to FIG. 2, the ball 15 may be rotated 180° from a position in which passage 28 is in full alignment with end port A to a position in which the passage 28 is in full alignment with end port B. In the middle between these extreme positions, the passage 28 is completely out of communication with both end ports. The particular ball position shown in FIG. 2 is one in which the passage 28 is in partial alignment with end port A but is completely closed off from end port B. End port B may thus be considered the upstream port, and pressure therein acts on the ball 15 as shown by the arrows 72.

The summation of the upstream pressures is a vector $C_p$ which is directed at the center of the ball. The reaction forces of the downstream seat seal 42 on the ball are suggested by the arrows 73. With the ball in a partially open position (partially open to port A), the reaction forces of the downstream seat seal are not evenly distributed but rather are concentrated in the seat seal areas adjacent the ball nose, i.e., the rounded edge of the passage 28. These are the areas designated 74 and 75 in FIG. 3 and correspond to the areas occupied by pads 48 and 49 of FIG. 5.

Figure 3:
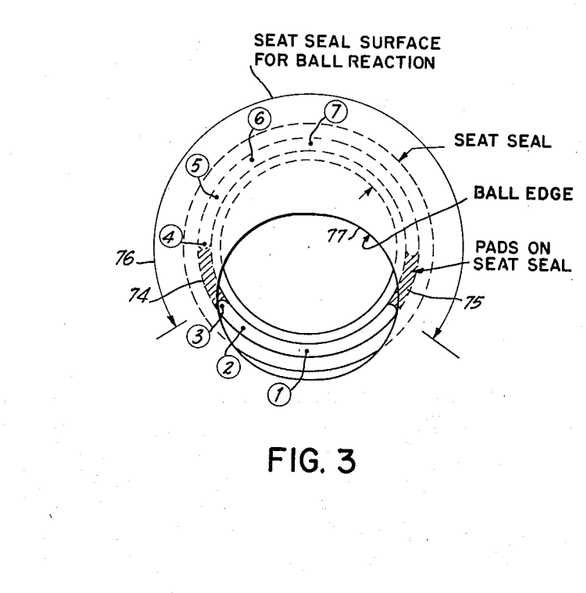
FIG. 3 is a diagrammatic partial sectional view taken along the line 3—3 of FIG. 2.

The areas 74 and 75 are located at opposite ends of one semicircular portion of the seal, this being the portion toward which the ball nose moves as the ball is moved to open the corresponding port. If the ball were permitted to rotate towards the port open position in the opposite direction, the areas 74 and 75 would be similarly located on the opposite semicircle.

Since the center of seal reaction in an axial direction must coincide with the center of axial thrust acting on the ball, the result is an uneven load distribution on the seat seal, with the greatest load being adjacent the ball nose. This condition is demonstrated graphically in FIG. 4, which is a curve showing the reaction force between the seat seal and the ball surface on the downstream seat seal as a function of circumferential position along the seat seal in FIG. 3. In FIG. 3 the ball surface is in contact with the seat seal over an arc 76. The remainder of the circle including the arm 76 is represented by the ball passage 28, the edge or nose of which is shown as the circle 77.

Figure 4:
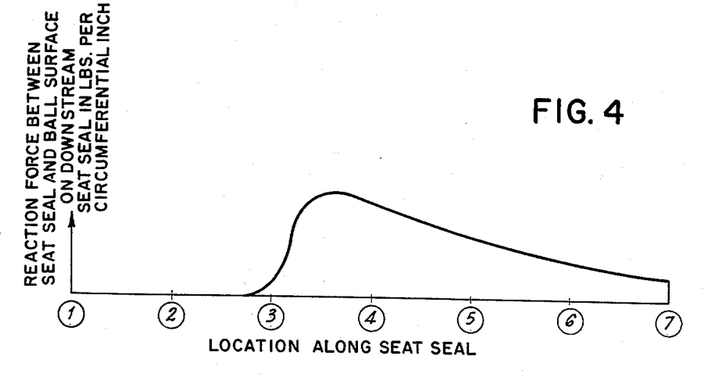
FIG. 4 is a curve showing approximate magnitudes of the reaction force on the downstream seat seal of FIG. 3 at different positions along the downstream seat seal.

In the space between position 1 and just before position 3, the ball passage is opposite the seat seal and hence there is no contact between the seat seal in this area and the ball, and hence no reaction force exists. The reaction force increases to a maximum between positions 3 and 4 and then tapers off gradually to a minimum at position 7. FIG. 4 shows the curve for only half the seal, but the other half is symmetrical. The actual value of the maximum unit loading will depend on the ball position and will be greatest when the entire ball edge (passage 28 mouth) is out of contact with the seal substantially as shown in FIG. 2, since then the minimum seal surface will be in contact with the ball.

The higher unit bearing pressure on the seat seal occurs in and adjacent to the areas 74 and 75. The higher unit bearing pressure, coupled with the fact that the ball edge contacts the point of highest unit loading and is sliding on the seal material as the valve is operated, causes the seat seal in and adjacent to the areas 74 and 75 to wear locally at a higher rate than the other parts of the seat seal. This causes an increased wearing rate of sealing surface 69, see FIG. 10, resulting in a rapid deterioration of surface 69 to the extent that it is no longer possible to maintain sealing contact between the surface of the ball and surface 69. The problem in this regard is greater in a three-way valve than in a straight through two-way valve, since the ball thrust, vector $C_p$, is determined in the three-way valve by upstream pressure acting on the ball over the inside seal diameter (as in a two-way valve) and also by upstream pressure acting on the upstream seal area between the seal inside and outside diameters. The thrust force $C_p$ on a three-way ball may be approximately 2¼ times as large as that on a two-way valve. Moreover, in a two-way valve straight through porting practically eliminates large differential pressure thrust forces when the valve is partially open.

The high wear rate referred to above occurs on the front side main bearing area 69, i.e., on the seal surface 46 (FIG. 6), over the circumferential portions 74 and 75 (FIG. 3). In accordance with the invention, the pads 48 and 49 are provided on the surface 44 in the portions 74 and 75 to provide additional support for the ball over the portions of maximum unit load. The pads thus present additional bearing area at the points of greatest load and hence lower the bearing pressure on the corresponding points of sealing surface 46 to a reasonable working level at which inordinately rapid wear will not occur.

The pads 48 and 49 should have a wearing rate about the same as the wearing rate of the sealing surface 46. If the pads wear at a faster rate, the result would be essentially to eliminate the pad effect after a small number of operating cycles. A slower wearing rate would tend to result in hard spots at the pad, leaving nonuniform sealing forces between the ball and the sealing surfaces of the seal. Approximately the one-third radially outward portion of each pad will come into bearing contact with the ball. The actual proportion will be lesser for a new seal and will increase somewhat as the seal wears. Contact of the ball 15 with the pad 48 is illustrated in FIGS. 11A and 11B, which show the seal located in a valve seat and in operative contact with ball 15.

The pads 48 and 49 should have a circumferential extent sufficient to accommodate the high unit loading in the seat seal area adjacent the ball passage edge when the ball is in its various partially open positions. As shown in FIG. 5, each of the pads extends over an arc of 35°. However, it has been found that this arc may lie in the range of about 25–45°, and in this range will provide the support necessary to overcome the high unit bearing loads encountered as the ball turns to open or close the adjacent port.

Since the pads should be located in fixed circumferential positions relative to the ball passage, it is necessary to insure that the seals are installed in the proper orientation, and that this orientation is maintained in service. As shown in FIG. 2, this object may be accomplished by means of a locating pin, shown at 65, acting in a hole provided in the seat seal back surface and a corresponding hole in the valve seat. It is desirable that the locating pin be positioned at the seal fulcrum point, since this location insures minimum stresses and represents a point of minimum relative motion between the seal and the seat. Moreover, no sealing action is required of the seal at the fulcrum point and hence no leakage will result. It is desirable that the seat seal recess which accommodates the locating pin be slightly elongated in a radial direction relative to the seat seal axis in order to accept the slight relative motion which will occur at this point.

Figure 8:
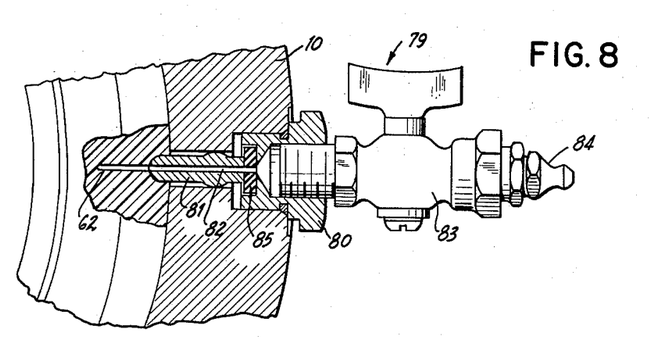
FIG. 8 is an enlarged partial view, partly in cross section, illustrating in detail a portion of the valve body, valve body seat seal and grease assembly for the valve of FIG. 1.

When the valve is to be lubricated, as described below, the grease pin may serve the function of the locating pin, since the grease pin acts in corresponding apertures in the valve body and seat seal, as shown in FIGS. 2 and 8.

A further aspect of the invention is particularly applicable to valves intended for repeated cycles of operation under high differential pressures, e.g., differential pressures of 600 p.s.i. or more. This aspect of the invention involves the injection of a lubricant into a reservoir or pocket formed by the space between the seat seal front side bearing surfaces and the ball. This pocket is bounded on one side by the ball 15, on the other side by surfaces 44 and 46, and at the ends by radially inner (main) bearing surface 69 and radially outer (auxiliary) bearing surface 70.

The lubricant is preferably a heavy bodied waterproof pump grease of high viscosity and high cohesion qualities. The presence of the lubricant affords a low operating torque even under high differential pressure conditions, and assists in affording a leak-free valve even under repeated cycles of operation.

Referring particularly to FIGS. 2, 7 and 8, lubricant is injected into the pocket 78 through passage 62 in seat seal 41. A grease assembly, designated generally 79, is mounted in an aperture in valve body 10 by means of a threaded plug 80. The forward end of grease assembly 79 is formed as a pivoted bushing or grease pin 81, which is accommodated by the space 63 in seal 41. The bushing 81 has a central grease carrying passage 82, which is aligned with passage 62 when the grease assembly is in place in valve body 10. The grease assembly also comprises a ground key cock 83, a grease fitting 84 and a cushion 85. The cushion 85 has an aperture aligned with the apertures 62 and 82 and is cemented to the bushing 80.

When lubricant under pressure is supplied to grease fitting 84, and with key cock 83 open, the lubricant will be forced through aperture 82 and aperture 62 into the pocket 78 between bearing areas 69 and 70.

While grease may be supplied to either or both of the seat seals 41 and 42, manufacturing problems are somewhat simpler if the grease assembly is mounted to the valve body, as shown. In general, if either the valve body seat seal or the valve bonnet seat seal is supplied with lubricant, as described, the lubricant grease will be wiped by the ball during valve operation and will be deposited in the pocket of the other seat seal, thus affording lubrication of both seat seals.

Contact between bushing 81 and the walls of aperture 63 in seal 41 serves the seat seal locating function of locating pin 65, and hence no separate locating pin is required.

A two-way ball valve may be lubricated in a similar manner, as illustrated in FIG. 9. In FIG. 9 the valve body is designated 90 and has a seat 91 corresponding to the seat 37 of FIG. 1. The floating ball is designated 92 and the seat seal is designated 93. The seat seal 93 is similar to the seal 41 but has a lip 104 at the radially inner end of the front face and along which sealing with the ball occurs. This is the main seal-ball bearing surface. The auxiliary or outer bearing surface is along the surface 104, which may be provided with pads corresponding to pads 48 and 49.

The seal 93 bears against the seat in areas 95 and 96, but between these areas is a pocket 97. Grease may be supplied to the pocket 97 through a grease fitting 98, a ground key cock 99 and a bushing 100 mounted in an aperture in valve body 90 and communicating with pocket 97 through a passage 101. Grease assembly 99 preferably will be in threaded engagement with the valve body. A grease hole 102 provides communication between the pocket 97 and a pocket 103 corresponding to the pocket 78. The pocket 103 is bounded by the ball and the seat seal front face between front side bearing areas 104 and 105.

Grease forced into pocket 97 through grease fitting 98 is trapped in pocket 97 except for grease flowing through hole 102 drilled in seal 93. The grease flowing through hole 102 enters pocket 103. With the valve closed, continued pumping of grease into the grease fitting will result in first filling grease pocket 97 and then grease pocket 103. Further filling with grease will cause grease to pass out of space 103 into the valve cavity through the pressure relief grooves (not shown) which afford venting between space 103 and the valve cavity. If desired, grease could be injected directly into the pocket 103, as described for the three-way valve.

While the invention has been described in specific embodiments thereof and in specific uses, various modifications thereof will occur to those skilled in the art without departing from the spirit and scope of the invention as set forth in the appended claims.

What is claimed is:

1. A valve, comprising a valve housing having first and second ports; a rotatable ball disposed in the space within said housing and having a fluid passage arranged in one rotational position of said ball to provide communication between said ports, said ball, in another rotational position thereof, being arranged to prevent communication between said ports, said passage having a circular mouth with a rounded edge forming a ball nose, said mouth being in axial alignment with said first port when said ball is turned to fully open said first port; said housing having a valve seat adjacent and concentric with said first port; and a flexible annular seat seal ring disposed in said seat and having a rear face arranged to contact said seat and a front face arranged to contact said ball, said front face having first and second radially and axially spaced annular load bearing areas each arranged to contact said ball under predetermined load conditions, the radially inner one of said load bearing areas being arranged to be in fluid-tight sealing contact with said ball when said ball is in said other rotational position thereof, said front face having a pair of circumferentially spaced pads each forming a part of said radially outer load bearing area and each providing said radially outer load bearing area with a substantially greater radial length in the region of said pads than in the remainder of said radially outer load bearing area, the circumferential location of said pads and the circumferential length thereof corresponding to the respective circumferential portions of said radially inner load bearing area located adjacent said ball nose as said ball is rotated through an arc in which said first port is partially open to said passage.

2. A valve, comprising a valve housing having first and second ports; a rotatable ball disposed in the space within said housing and having a fluid passage arranged in one rotational position of said ball to provide communication between said ports, said ball, in another rotational position thereof, being arranged to prevent communication between said ports, said passage having a circular mouth with a rounded edge forming a ball nose, said mouth being in axial alignment with said first port when said ball is turned to fully open said first port; said housing having a valve seat adjacent and concentric with said first port; a flexible annular seat seal ring disposed in said seat and having a rear face arranged to contact said seat and a front face arranged to contact said ball, said front face having first and second radially and axially spaced annular load bearing areas each arranged to contact said ball under predetermined load conditions, the radially inner one of said load bearing areas being arranged to be in fluid-tight sealing contact with said ball when said ball is in said other rotational position thereof, said front face having a pair of circumferentially spaced pads each forming a part of said radially outer load bearing area and each providing said radially outer load bearing area with a substantilly greater radial length in the region of said pads than in the remainder of said radially outer load bearing area, the circumferential location of said pads and the circumferential length thereof coinciding substantially with the respective circumferential portions of said radially inner load bearing area traversed by said ball nose as said ball is rotated to open and close said first port; and means acting in said housing and contacting said seal ring to prevent circumferential displacement of said seal ring.

3. A valve as set forth in claim 2 in which the radially outer porton of said front face and including said second load bearing area is generally concave in cross section except for said pads.

4. A valve, comprising a valve housing having first and second ports, said housing having a first aperture; a rotatable ball disposed in the space within said housing and having a fluid passage arranged in one rotational position of said ball to provide communication between said ports, said ball, in another rotational position thereof, being arranged to prevent communication between said ports, said fluid passage having a circular mouth with a rounded edge forming a ball nose, said mouth being in axial alignment with said first port when said ball is turned to fully open said first port; said housing having a valve seat adjacent and concentric with said first port; a flexible annular seat seal ring disposed in said seat and having a rear face arranged to contact said seat and front face arranged to contact said ball, said front face having first and second radially and axially spaced annular load bearing areas each arranged to contact said ball under predetermined load conditions, said front face being spaced from said ball in the region between said load bearing areas to form a pocket, the radially inner one of said load bearing areas being arranged to be in fluid-tight sealing contact with said ball when said ball is in said other rotational position thereof, said front face having a pair of circumferentially spaced pads each forming a part of said radially outer load bearing area and each providing said radially outer load bearing area with a substantially greater radial length in the region of said pads in the remainder of said radially outer load bearing area, the circumferential location of said pads and the circumferential length thereof coinciding substantially with the respective circumferential portions of said radially inner load bearing area traversed by said ball nose as said ball is rotated to open and close said first port, said seal ring having a second aperture forming a lubricant carrying passage communicating at one end thereof with said pocket; and lubricant carrying means mounted on said housing and extending through said first aperture and into said second aperture for supplying lubricant to said pocket, contact between said lubricant carrying means, said housing and the walls of said second aperture preventing circumferential displacement of said seal ring.

5. A valve, comprising a valve housing having first and second axially aligned end ports and a common port; a rotatable ball disposed in the space within said housing and having a fluid passage arranged in a first rotational position of said ball to provide communication between said common port and said first end port only, in a second rotational position of said ball to provide communication between said common port and said second end port only, and in a third rotational position of said ball to prevent communication between said common port and both of said end ports, said fluid passage having a circular mouth with an edge forming a ball nose and arranged to be aligned with the corresponding end port when said ball is in said first and second positions thereof; said housing having an annular valve seat adjacent and concentric with each of said end ports; and a pair of annular seat seal rings each disposed in one of said seats and arranged to hold said ball therebetween, each of said seal rings having an inner diameter corresponding to the diameter of said passage, an outer diameter corresponding to the outer diameter of said seat, a rear face, a front face extending radially and inwardly from said inner diameter and arranged to contact said ball only over a first limited annular area adjacent said inner diameter under preload conditions and over a limited annular region including said first area and a second limited annular area under substantial load conditions urging said ball and said seal ring into contact, said second area being radially and inwardly spaced from said first area, said front face having a pair of circumferentially spaced pads each forming a part of said second area and each providing a substantially greater radial ball contacting length than the remainder of said second area, the circumferential location of said pads and the circumferential length thereof coinciding substantially with the respective circumferential portions of said first area located adjacent said ball nose as said ball is rotated through an arc in which the corresponding end port is partially open to said passage.

6. A valve, comprising a valve housing having first and second axially aligned end ports and a common port; a rotatable ball disposed in the space within said housing and having a fluid passage arranged in a first rotational position of said ball to provide a communication between said common port and said first end port only, in a second rotational position of said ball to provide communication between said common port and said second end port only, and in a third rotational position of said ball to prevent communication between said common port and both of said end ports, said fluid passage having a circular mouth with a rounded edge forming a ball nose and arranged to be aligned with the corresponding end port when said ball is in said first and second positions thereof, said housing having an annular valve seat adjacent and concentric with each of said end ports, each of said seats comprising an annular radially extending surface and an annular axially extending surface; a pair of annular seat seal rings each disposed in one of said seats and arranged to hold said ball therebetween, said seal rings being formed from a material having substantial flexural stiffness and hardness and a relatively high modulus of elasticity, each of said seal rings having an inner diameter corresponding to the diameter of said passage, an outer diameter corresponding to the diameter of said axially extending surface, a rear face, a front face extending radially and inwardly from said inner diameter and arranged to contact said ball only over a first limited annular area adjacent said inner diameter under preload conditions and over a limited annular region including said first area and a second limited annular area under substantial load conditions urging said ball and said seal ring into contact, said second area being radially and inwardly spaced from said first area, said front face having a pair of circumferentially spaced pads each forming a part of said second area and each providing a substantially greater radial ball contacting length than the remainder of said second area, the circumferential location of said pads and the circumferential length thereof coinciding substantially with the respective circumferential portions of said first area traversed by said ball nose as said ball is rotated through an arc in which the corresponding end port is partially open to said passage; and means acting in said housing and contacting said seal rings and arranged to prevent circumferential displacement of said seal rings.

7. A valve, comprising a valve housing having first and second axially aligned end ports and a common port; a rotatable ball disposed in the space within said housing and having a fluid passage arranged in a first rotational position of said ball to provide communication between said common port and said first end port only, in a second rotational position of said ball to provide communication between said common port and said second end port only, and in a third rotational position of said ball to prevent communication between said common port and both of said end ports, said fluid passage having a circular mouth with a rounded edge forming a ball nose and arranged to be aligned with the corresponding end port when said ball is in said first and second positions thereof, said housing having an annular valve seat adjacent and concentric with each of said end ports, each of said seats comprising an annular radially extending surface and an annular axially extending surface; and a pair of annular seat seal rings each disposed in one of said seats and arranged to hold said ball therebetween, said seal rings being formed from a material having substantial flexural stiffness and hardness and a relatively high modulus of elasticity, each of said seal rings having an inner diameter corresponding to the diameter of said passage, an outer diameter corresponding to the diameter of said axially extending surface, a rear face, a front face extending radially and inwardly from said inner diameter and arranged to contact said ball only over a first limited annular area adjacent said inner diameter under preload conditions and over a limited annular region including said first area and a second limited annular area under substantial load conditions urging said ball and said seal ring into contact, the radially outer portion of said region including said second area being concave in shape, said front face having a pair of circumferentially spaced pads each projecting from said concave portion and forming a part of said second area and each providing a substantially greater radial ball contacting length than the remainder of said second area, the circumferential location of said pads and the circumferential length thereof coinciding substantially with the respective circumferential portions of said first area located adjacent said ball nose as said ball is rotated through an arc in which the corresponding end port is partially open to said passage.

8. A valve as set forth in claim 7 in which said pads each extend circumferentially over arcs lying in the range of 25°–45°.

9. A valve, comprising a valve housing having first and second axially aligned end ports and a common port; a rotatable ball disposed in the space within said housing and having a fluid passage arranged in a first rotational position of said ball to provide communication between said common port and said first end port only, in a second rotational position of said ball to provide communication between said common port and said second end port only, and in a third rotational position of said ball to prevent communication between said common port and both of said end ports, said fluid passage having a circular mouth with a rounded edge forming a ball nose and arranged to be aligned with the corresponding end port when said ball is in said first and second positions thereof; said housing having an annular valve seat adjacent and concentric with each of said end ports, each of said seats comprising an annular radially extending surface and an annular axially extending surface, said housing having an aperture extending through one of said surfaces of a particular one of said seats; a pair of annular seat seal rings each disposed in one of said seats and arranged to hold said ball therebetween, said seal rings being formed from a material having substantial flexural stiffness and hardness and a relatively high modulus of elasticity, each of said seal rings having an inner diameter corresponding to the diameter of said passage, an outer diameter corresponding to the diameter of said axially extending surface, a rear face, a front face extending radially and inwardly from said inner diameter and arranged to contact said ball only over a first limited annular area adjacent said inner diameter under preload conditions and over a limited annular region including said first area and a second limited annular area under substantial load conditions urging said ball and said seal ring into contact, said second area being radially and inwardly spaced from said first area, said front face being spaced from said ball between said first and second areas to form a pocket, said front face having a pair of circumferentially spaced pads each forming a part of said second area and each providing a substantially greater radial ball contacting length than the remainder of said second area, the circumferential location of said pads and the circumferential length thereof coinciding substantially with the respective circumferential portions of said first area located adjacent said ball nose as said ball is rotated through an arc in which the corresponding end port is partially open to said fluid passage, the one of said seal rings in said particular seat having a second aperture aligned with said first aperture and forming a lubricant passage communicating at one end thereof with said pocket; and means extending through said first aperture and into said second aperture to supply lubricant under pressure to said pocket and to prevent circumferential displacement of said one of said seal rings having said second aperture.

References Cited in the file of this patent

UNITED STATES PATENTS

| 2,932,311 | Scherer | Apr. 12, 1960 |
| 2,989,990 | Bass | June 27, 1961 |

FOREIGN PATENTS

| 847,560 | Great Britain | Sept. 7, 1960 |